Figure 1:
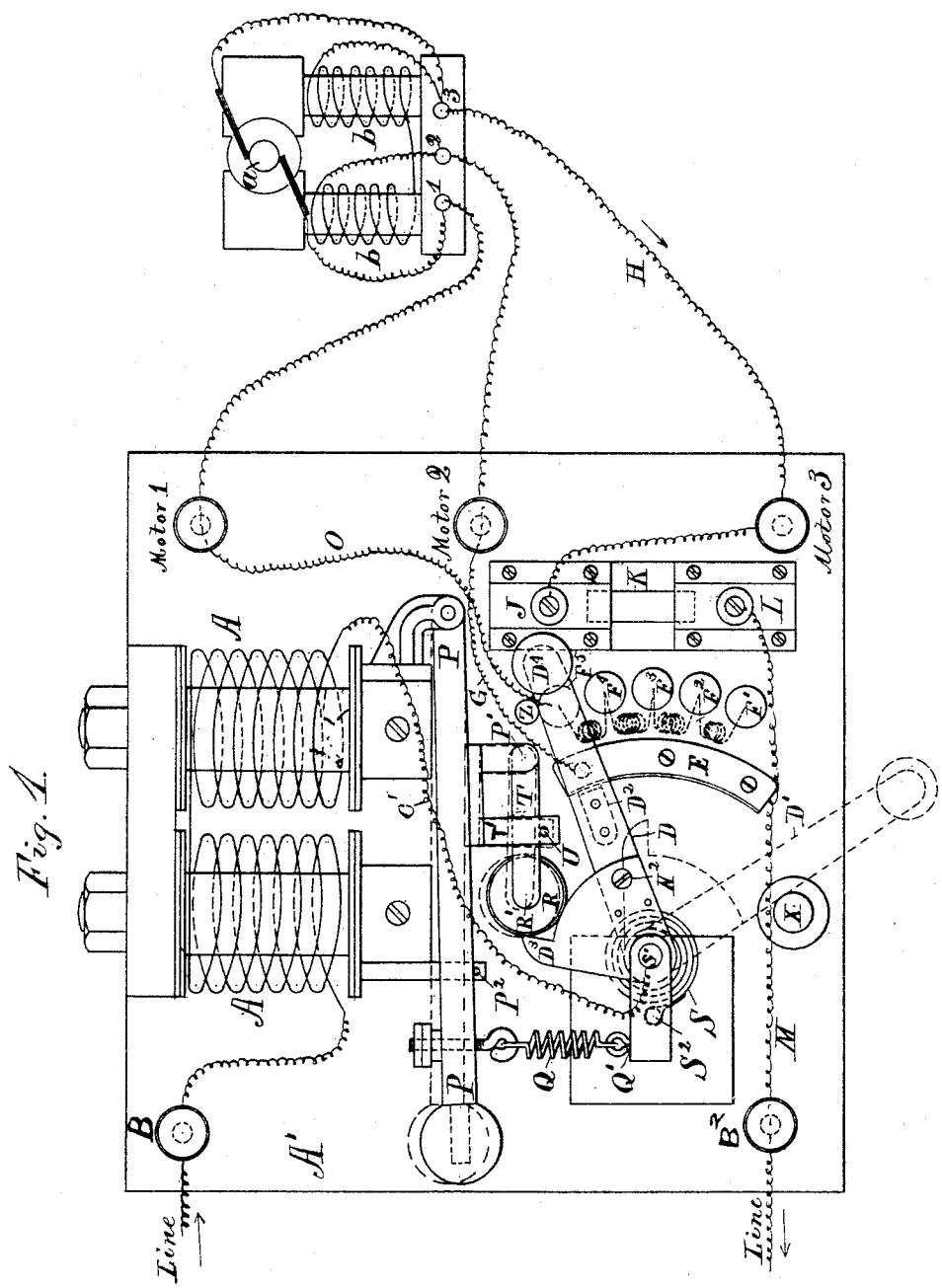

(No Model.) 2 Sheets—Sheet 1.
W. BAXTER, Jr.
AUTOMATIC SWITCH FOR ELECTRIC MOTORS.
No. 449,660. Patented Apr. 7, 1891.

(No Model.) 2 Sheets—Sheet 2.

W. BAXTER, Jr.
AUTOMATIC SWITCH FOR ELECTRIC MOTORS.

No. 449,660. Patented Apr. 7, 1891.

Attest:
L. Lee.
H. J. Miller.

Inventor.
William Baxter, Jr.
per Crane & Miller, Attys.

UNITED STATES PATENT OFFICE.

WILLIAM BAXTER, JR., OF BALTIMORE COUNTY, ASSIGNOR TO THE BAXTER ELECTRIC MANUFACTURING AND MOTOR COMPANY, OF BALTIMORE, MARYLAND.

AUTOMATIC SWITCH FOR ELECTRIC MOTORS.

SPECIFICATION forming part of Letters Patent No. 449,660, dated April 7, 1891.

Application filed October 21, 1887. Serial No. 252,963. (No model.)

*To all whom it may concern:*

Be it known that I, WILLIAM BAXTER, Jr., a citizen of the United States, residing in the Ninth election district of the county of Baltimore, Maryland, have invented certain new and useful Improvements in a Combined Hand-Switch and Automatic Cut-Out for Electric Motors or Dynamos, fully described and represented in the following specification and the accompanying drawings, forming a part of the same.

This invention relates to that class of devices called "cut-outs," whose object is to prevent the burning out of the insulation and wire in a constant potential electric motor or dynamo by a current of too great intensity; and the mechanism which I have devised is adapted both for starting the machine by hand and for automatically opening the circuit through the machine should the strength of current from any cause increase beyond a safe limit.

The invention is intended for use particularly with a constant potential motor or dynamo, in which case the machine may be wound either in series or with a shunt or compound winding. In any case the current that will pass through the armature when at rest is much greater than when running, as in the former case there is no counter electro-motive force operating within the machine to resist the current. This will be understood by supposing a motor to be constructed for operating with a current having an electro-motive force of one hundred volts. Should such a machine be series-wound and have a resistance of two ohms, the current passing through it when standing still would be fifty ampères; but the counter electro-motive force set up by the armature when running at its normal speed might be equal to ninety-six volts, so that only four volts of the electro-motive force would operate to overcome the resistance of the wire in the machine, which, being two ohms, would reduce the operative current to two ampères. While operating at its normal speed the machine would not, therefore, admit a current greater than two ampères; but if standing still, with the whole electro-motive force of the same current applied to it, it would be traversed by a current of fifty ampères. This would be sufficient to melt the wire, as the capacity of the latter, being made to convey a current of only two ampères, would be wholly insufficient to transmit so large a current safely. A series-wound motor would not be self-regulating if supplied with current at constant potential. Such motors are therefore preferably wound with either a shunt or compound winding. In both the latter styles of winding the difference between the normal current—that is, the current at normal velocity—and the current when the motor is standing still is much greater than with a series motor, owing to the fact that the resistance of the main circuit in the motor is much less than the resistance of a series-wound machine. As an example, a similar shunt-wound motor, to operate with a current of one hundred volts, would have an armature resistance of about one ohm, and when at rest the current through the armature would be about one hundred ampères. A similar motor with compound winding for a current of one hundred volts would have a resistance in the armature-circuit of about one and one-half ohms, and the current would therefore be about sixty-six ampères with the machine at rest.

The operative magnet of my hand-switch and cut-out is intended especially to be located in the main circuit with the motor or dynamo, and the whole device is adapted to prevent the passage of this enormous current through the machine when it is being started, or at any time after it is in motion, if suddenly arrested so as to reduce the counter electro-motive force of the rotary armature. Should such a heavy current be suddenly thrown into the motor to start it, the start would be very violent and liable not only to injure the machine and burn the wire, but also to cause a great disturbance in the circuit. To prevent these evils, it is common to start constant potential motors in connection with a variable resistance high enough to keep the current down to a safe limit, and as the speed of the motor increases the resistance is gradually cut out, so that when the normal velocity of the armature is attained the extraneous resistance may be wholly removed and the motor receive the full electro-motive force of the current. The counter electro-motive force set up by the armature is due to the speed, and is therefore dependent on it, so that if the speed increases the counter electro-motive force will increase, and the current passing through the armature will correspondingly fall, while if the speed diminishes the counter electro-motive force will decrease, and the current passed through the armature be correspondingly increased. By a sufficient reduction in the speed the current may therefore increase sufficiently to melt the wire, and an overloading of the motor far above its capacity will greatly reduce its velocity, and therefore permit the current to increase sufficiently to destroy the machine. To prevent the latter contingency, a safety-fuse is sometimes inserted in the circuit, and my construction includes such a fuse, combined with clamps connected with the circuit connections and mounted upon the same bed or frame, with a spring-moved hand-switch, a lock for the same, and a magnet traversed by the current to automatically unlock the switch and cut out the motor, when the resistance to the current therein falls below a safe point.

The annexed drawings show an apparatus embodying my improvements; but the constructive features may be materially modified without departing from my invention.

Figure 2:
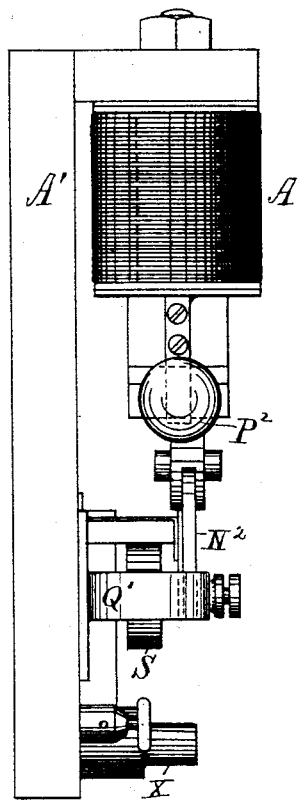
Figure 4:
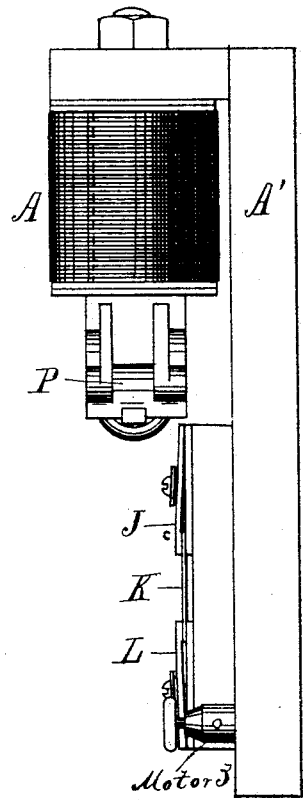
Figure 3:
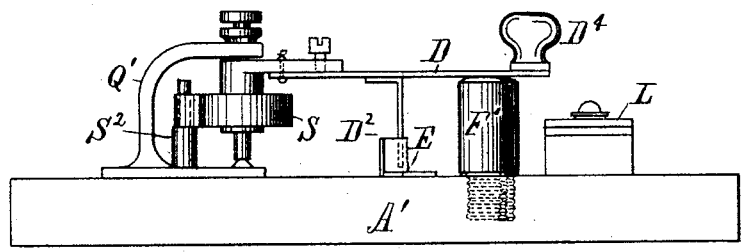
Figure 5:
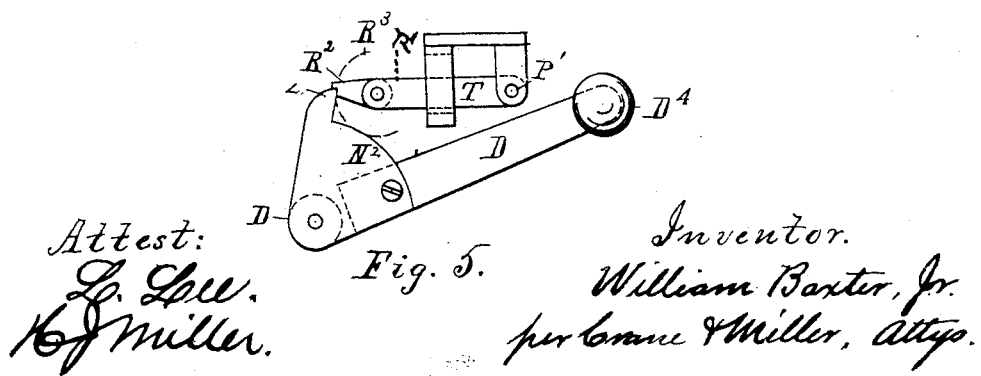

Figure 1 is a plan of a bed-plate carrying a hand-switch and automatic cut-out mechanism, shown in connection with a diagram illustrating a shunt-wound motor, and an arrangement of circuits adapted to start and operate the same. Fig. 2 is an edge view of the bed-plate and its attached devices, as seen from the left side of Fig. 1. Fig. 3 is a similar edge view as seen from the lower side of Fig. 1. Fig. 4 is an edge view as seen from the right-hand side of Fig. 1, and Fig. 5 is an alternative construction for the locking device.

A′ is the bed-plate. A A is an electro-magnet attached thereto and placed in circuit with the motor or its armature. P is its armature, hinged to one of the poles and provided at its movable end with a spring Q, attached to a fixed point Q′, and with a stop P² to limit its movement toward the spring.

D is a switch-lever pivoted upon a stud s′ and provided with a smooth segment N², having at one end a tooth D³. A spring D² is attached to the switch-lever and fitted to a curved contact-plate E, and a series of contact-studs F′ F² F³ F⁴ F⁵ are arranged adjacent to the plate E and connected together through resistances N with the last stud F⁵, connected to the armature of the motor. A stop Z is provided to arrest the switch-lever when it rests upon one end of the plate E and the stud F⁵, and a stop X is also provided to arrest the lever when moved wholly from the other end of the plate E and stud F′, as indicated by the dotted lines D′. A spring S is attached to the hub of the switch-lever and to a pin S², and operates to throw the lever normally toward the stud X to break all its contacts.

Attached to the armature P is a fulcrum p′ for a lever T, having a roller R pivoted upon its free end, the lever being steadied by a guide T′, which permits the lever T to move freely toward the armature, and arrests it by means of a pin U when moved in the opposite direction with the roller in contact with the segment N². The armature is shown retracted from the poles of the magnet A A by the spring Q; but the magnet is constructed to overcome the attraction of the spring and draw the armature toward the poles when the strength of the current in the circuit exceeds a safe limit, at the same time lifting the lever T bodily by means of its pivot P′ and stop-pin U. The tooth D³ when locked by the roller is pressed firmly against the same by the spring S, and the length of the tooth is so proportioned to the diameter of the roller R that when the roller rests upon the segment N² the point of the tooth is slightly above the line of the fulcrum P′ and the roller-pivot R′, and tends to press the roller toward the segment and to hold the switch-lever in a locked position and resting upon the resistance-stud F⁵. A very slight movement of the roller from the segment is produced by the movement of the armature P, and the lifting of the lever T by the stop U causes the tooth to press the roller upward, together with the free end of the lever T, so that the tooth may move entirely past the roller and the switch-lever fly to its inoperative position. (Shown in the dotted lines D′.)

K is a fusible strip with such a cross-section that it will be melted when traversed by a current stronger than the motor will stand, and thus operate to open the circuit, and is clamped in the holders J and L. These holders are fixed to the bed-plate A′ and are provided with suitable means for securing the opposite ends of the fuse in electrical connection with the circuit-wires and for permitting the convenient renewal of the fuse when destroyed. The entire current which passes through the switch is compelled to traverse the fuse, and the arrangement of the clamps upon the bed A′ thus makes the fuse a part of the whole organism.

B and B² are binding-posts for the line-wires, and three binding-posts (marked, respectively, motor 1, motor 2, and motor 3) are affixed upon the opposite edge of the bed-plate for use with a compound or shunt wound motor. The circuit in such case passes from post B, through the coils of the magnet A A and the wire c′, to the pivot or hub of the switch-lever D. A connection O is formed between the resistance F⁵ and the post-motor 1, and from the curved contact-plate E through the wire G to the post-motor 2, while the post-motor 3 receives the return-current from the motor through the wire H, from which it passes to the fuse-clamp J, and, after traversing the fuse through the clamp L and wire M, to the line-post B². Upon the motor binding-posts 1, 2, and 3 are shown the current passing from the post 1 through the armature $a$ to the post 3, and from the post 2 through the field-coils $b$ to the post 3, from whence the current passes to the line through the wire H.

In Fig. 1 the switch is shown in the position it occupies when the motor is running at normal speed, and when the motor is stopped it would be in the position shown by the dotted lines D'.

The operation of the device is as follows: The operator closes the circuit through the motor by moving the switch-lever from its inoperative position to contact with the nearer end of the plate E and first resistance-stud F', thus connecting all the resistances N with the circuit through the armature. As the velocity of the motor increases and sets up a counter electro-motive force in the armature, the operator moves the switch-lever gradually to the other studs $F^2$, $F^3$, and $F^4$, thus gradually cutting out the resistances N, and when the motor has attained its normal speed shifts the switch-lever to the stud $F^5$, which, being connected with the circuit beyond the last resistance, throws the full electro-motive force of the current into the armature, as desired. If the resistance of the motor has attained the required point, the current flowing through the circuit and through the coils of the magnet A will be reduced in the desired degree and cannot sustain its armature P against the tension of the spring Q, and the armature will therefore drop to the pin $P^2$, permitting the roller-arm T to assume its lowest position, as shown in Fig. 1. The switch-lever, when placed in contact with the stud $F^5$, will then be in a position for the tooth $D^3$ to engage with the roller R and to be locked thereby in the desired manner; but if the current for any reason be not reduced to the required degree the armature will be held up by the magnet and the roller will not retain the switch-lever in its locked position. Should the operator attempt to leave the switch-lever in contact with the stud $F^5$ and the resistances all cut out of the circuit while a current too strong is flowing through the motor, the switch-lever would be automatically shifted to its inoperative position by the action of the spring S, which would throw it toward the stop X as soon as the operator's hand was removed from the handle $D^4$ of the switch-lever, and thus wholly cut the motor out of the circuit by interrupting the current at F and E. In like manner, if the operator leaves the handle in contact with the stud $F^4$ or $F^3$ with an extraneous resistance in the circuit, the circuit will be broken by the action of the spring S as soon as he removes his hand. It will be noticed that so long as the current remains normal the roller would hold the switch locked and the circuit closed without extraneous resistance; but as soon as the current is increased, as by a diminution of the motor's speed through overloading or by an accidental short circuit at any point, the armature P would disengage the locking device and the switch-lever would shift automatically to its inoperative position.

The object of the curved contact-plate E is to connect the field-coils $b$ of the motor with the current, so that they may receive its full force and the motor field be magnetized to its full strength and ready for action as soon as the current passes through the armature; but such separate contact-plate would not be needed if the motor were wound in series, as only a single wire to and from the motor would be needed to form the required circuit, and such wire would be connected with the stud $F^5$, so as to receive the current gradually with the interposed resistances N when starting the motor.

The plate E is shown in the drawings extended nearer to the stop X than the first resistance-stud, so that the spring $D^2$ upon the switch-lever may make contact with the plate E before touching the stud, which, with the connections shown, leads the current to the armature. By making the contact first with the plate E the shunt or magnet coils $b$ are magnetized before the current is thrown into the armature. This construction is desirable when operating my device with a shunt-wound or compound-wound motor; but the plate E may be constructed to make contact with the switch-lever at the same time as the stud F'; or the plate may be dispensed with by suitably connecting the field-coils and the armature with the stud $F^5$ to convey the current through the motor in the desired manner.

The segment $N^2$ is preferably formed integral with the hub of the switch-lever, and the latter—i.e., the switch-lever—secured at its inner end to the segment and pressed by the set-screw $N^3$, inserted through the segment, so as to regulate the pressure of the switch-lever upon the studs F' and $F^2$, the switch-lever being made of sheet metal thin enough to spring under the pressure of the set-screw.

It will be noticed that the wheel R, the frame T, and the tooth $D^3$ constitute a modification of a toggle-joint, as the wheel cannot move upward so long as its center is below the line joining the point of the tooth $D^3$ and the pivot P'. Upon the contrary, the greater the pressure at $D^3$ the harder the wheel will press upon the segment $N^2$; but as soon as the center of the wheel is lifted by the movement of the armature above the said line the pressure of the tooth will force it entirely out of the way, so that the switch-lever may spring to its inoperative position. A regular toggle-joint might therefore be used, and such construction is shown in Fig. 5, in which the pivot R' has a short arm $R^2$ attached to it of the same radius as the wheel R and susceptible to the same movements, as is indicated by the dotted curve $R^3$, which shows that the end of the lever would be thrown downward in a path clearing the rim of the segment if the pivot R' were raised sufficiently, as by the armature, for the tooth to move toward such pivot.

The principal features of my device are applicable to constant potential dynamos to open the circuit if the current becomes too strong either by an accidental short circuit or by overloading; but in such case the resistances N would not be used.

It will be noticed that a toggle is especially adapted to resist the pressure of the tooth, which is moved with the switch-lever by the spring S, as the straightening of the toggle against the tooth prevents any movement of the toggle under such pressure, while the toggle is easily bent by lateral pressure applied from the armature P, and the remainder of its movement is then effected by the pressure applied at its end, as is clearly apparent in Fig. 5. Any radius of the wheel R operates against the point of the tooth substantially like the toggle-arm $R^2$ in such figure, and the lateral pressure upon the toggle is effected by the pin U, which presses upon the toggle-arm (formed by the lever T) when the armature is attracted to the magnet. It will be understood that the stud $F^5$ furnishes a direct connection from the hub of the switch-lever to the motor independent of the resistances N, while each of the other studs serves to throw more or less resistance into the circuit.

The mechanical arrangements for cutting off the current when the strength of the current is excessive are adapted to perform all the functions required of the device so long as they remain in effective operation; but as all mechanical structures are liable to derangement from accident or wear the safety-fuse furnishes an additional safeguard to prevent the destruction of the motor should the automatic mechanism fail to act.

The safety-fuse is intended to be of such cross-section that it will not melt until the current's strength has increased somewhat beyond the point at which the mechanism is intended to act, and it will never come into action to cut off the current until the mechanical portion of the device fails to operate.

The plate $e$ is not absolutely necessary with a shunt or compound wound motor; but such machines start more satisfactorily when the field is magnetized before the current enters the armature, and I therefore prefer to use the plate and throw the current into the field-coils first, where the construction permits it. I have, however, claimed the other elements of my invention independently of such means for first throwing the current into the field-coils.

I am aware that heretofore branch or derived circuits have been formed around the motor and the operative magnet of an automatic cut-out included therein and affected by variations of the electro-motive force in such branch or derived circuit. I do not, therefore, claim such an arrangement of circuits and cut-outs.

So far as the arrangement of the motor and cut-out is concerned, my invention differs from others in having both included in the main circuit, and the magnet A is thus affected by the variations in the main circuit directly.

Having thus set forth my invention, what I claim herein is—

1. The combination, with an electric switch and connections adapted to close the electric circuit, of a spring adapted to move the switch to its inoperative position, a tooth moved with the switch, a toggle straightened against such tooth, and an electro-magnet affected by the circuit through the switch and operated to bend the toggle to unlock the switch-lever, as and for the purpose set forth.

2. In a combined hand-switch and automatic cut-out for a shunt-wound motor or dynamo, the combination, with a switch-lever, of a series of contact-studs, as $F'$ $F^2$, &c., connecting interposed resistances, an electric circuit connected with the said lever and with the last of said studs, a spring to shift the lever to an inoperative position, a locking device to hold the lever in contact with the last of said studs, an electro-magnet affected by the circuit through the switch-lever and operated to disengage the locking device, and a contact-plate adjacent to the series of studs, with a spring upon the said lever to connect it electrically with the said plate, the studs and plate being connected, respectively, with the armature and with the field-coils of the motor or dynamo, as and for the purpose set forth.

3. In a locking device for an electric switch, the combination, with a switch-lever provided with electrical contacts, a spring for moving the same to an inoperative position, and a tooth moved with the lever, of a toggle straightened against the said tooth, an electro-magnet affected by the circuit through the switch, and an armature actuated by the magnet and operated to bend the toggle, as and for the purpose set forth.

4. In a combined hand-switch and automatic cut-out for electrical machinery, the combination, with a switch-lever provided with electrical contacts, a spring for moving the same to an inoperative position, of an electro-magnet affected by the current through the switch, an armature operated by the said magnet, an arm hinged to the armature and having a roller pivoted in its free end and movable to and from the armature, and a segment attached to the switch-lever with a projecting tooth at one end, the lever and segment being arranged in relation to the roller substantially as herein shown and described.

In testimony whereof I have hereunto set my hand in the presence of two subscribing witnesses.

WM. BAXTER, JR.

Witnesses:
  FELIX R. SULLIVAN,
  GEORGE E. SAVILLE.